United States Patent Office 3,318,906
Patented May 9, 1967

3,318,906
PROCESS FOR THE PRODUCTION OF
ETHYLENYLATED LACTAMS
James E. McKeon and Paul S. Starcher, Charleston,
W. Va., assignors to Union Carbide Corporation, a corporation of New York
No Drawing. Filed Nov. 6, 1964, Ser. No. 409,578
15 Claims. (Cl. 260—326.5)

This invention relates to the preparation of N-ethylenically unsaturated organic substituted lactams.

Heretofore, N-substitution of an ethylenically unsaturated radical on lactam, such as the vinylation of 2-pyrrolidone to form N-vinyl-2-pyrrolidone, has typically been effected by reaction of the lactam, e.g., pyrrolidone, with acetylene. Such a process is fraught with complications primarily because of the inherent instability and explosive potential of acetylene.

There is described herein a process which is extremely safe to operate, gives commercially attractive yields and may be operated utilizing relatively inexpensive ethylenically unsaturated monomers. For example, it is possible in accordance with the process of this invention to make N-vinyl-2-pyrrolidone by the reaction of ethylene with 2-pyrrolidone.

Broadly speaking, the process of this invention involves the reaction of an ethylenically unsaturated compound, e.g., an olefin, free of acetylenic unsaturation, with a lactam. Such reaction is termed herein and in the claims as being an "ethylenylation reaction" and the resulting product being an "ethylenylated lactam." This ethylenylation process involves contacting the unsaturated compound with a catalyst which is a reducible metal compound capable of possessing the higher of two stable valance states while complexed with the unsaturated compound (the "catalytic" state), while providing a lactam with the catalyst and unsaturated compound.

In preferred operation, a metal co-oxidant in the higher of at least two stable oxidized states is provided with the catalyst. The higher of the two stable oxidized states of the co-oxidant can occur upon reaction of a reduced form of the co-oxidant with an oxidizing agent, and in this higher oxidized state the co-oxidant is capable of oxidizing the metal of the catalyst to the catalytic valence state (i.e., the higher of the two valence states). The co-oxidant is repeatedly regenerated by contact with an oxidizing agent capable of converting the co-oxidant to said higher oxidized state prior to or during reaction when N-ethylenylation of the lactam occurs.

The lactam which may be treated in accordance with the process of this invention desirably possess only one

group. The lactam may contain from about 4 to about 20 ring members and, preferably, is essentially carbon, hydrogen, nitrogen and oxygen. The lactam should be free of non-aromatic unsaturation; may contain from 3 to 25 carbon atoms; and the lactam may possess from 1 to about 5 rings, preferably from 1 to 3 rings, as part of its structure. An important feature of the lactam is that it be free of all active hydrogen (as determined by the Zerewitinoff Method, Journal of the American Chemical Society, (1928) vol. 49, page 3181) other than the active hydrogen bonded to the nitrogen forming the lactam structure.

Illustrative of useable lactams, include, e.g.,

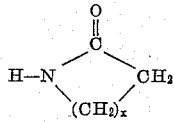

wherein $x$ is an integer of 1 to 18, e.g.,

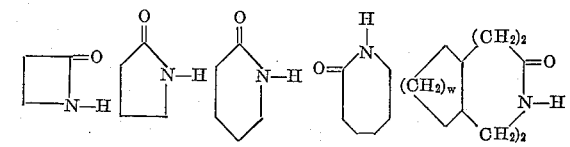

wherein $w$ is an integer of from 0 to about 16, such as, e.g.,

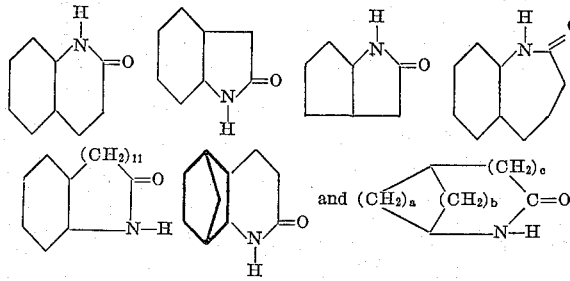

wherein $a$ and $b$ are integers of from 1 to 3 and $c$ is an integer of from 0 to 3, such as, e.g.

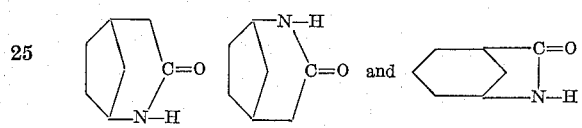

Aryl substituted lactams, such as e.g.,

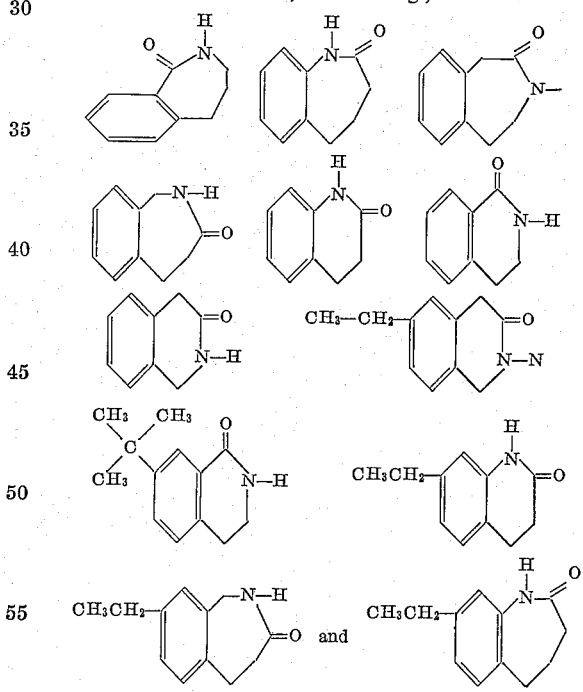

It is to be understood that the above list of lactams does not represent the only lactams which may be treated according to the process of this invention. The above list is merely intended to be illustrative and many other lactams possessing the characteristics defined above may be advantageously employed in the process of this invention.

The catalyst of the process of this invention is a metal in a higher valence state, which is typically either in the form of a salt of an inorganic acid or organic acid (carboxylic acids and organic substituted inorganic acids) or is complexed with a coordinating agent. It should be understood that in the usual case when the catalyst employed is originally in the salt form and thereafter is employed in solution, the catalyst may become a complex and the acid anions become ligands. Therefore, when the catalyst is termed to be a salt, it should be appreciated that it may be a complex during reaction but was a salt prior to reaction. The metal which forms the catalyst of this invention is one which in the catalyst form induces ethylenylation of the lactam. Also, the catalyst comprises a metal which in the higher valence state is sufficient to cause the ethylenylation reaction to occur without the presence of other reagents or catalytic materials.

Particularly desirable metals from which the catalyst of this invention may be derived are the precious metals of the transition series. This includes, e.g., palladium, platinum, iridium, rhodium, ruthenium, osmium and gold. Palladium, because of relatively low cost and other valuable processing reasons, is particularly preferred.

It is, of course, to be appreciated that any selected metal, in the performance of the catalyst, is dependent upon the chosen coordination agent, if complexed, or the selected anion when employed in salt form. Moreover, various processing variables govern the performance level of the catalyst, such as, the ethylenically unsaturated compound employed in the reaction, the presence or absence of solvents, the temperature, and the like. Thus, each metal may require a favorable environment for its use in the present invention.

In view of the preference for palladium, the remaining discussion of this invention is specific to its use as a salt or complex. It is to be understood that other metals of the type described above may be substituted for palladium and utilized in accordance with the discussions herein.

The salt form of the particular metal forming the catalyst may be, as indicated previously, the anion of an inorganic or organic acid. Thus, the anion forming the metal salt may be derived from strong or weak mineral acids such as hydrochloric acid, sulfuric acid, perchloric acid, nitric acid, phosphoric acid, sodium dihydrogen phosphate, disodium hydrogen phosphate, other alkaline metal salts of hydrogen phosphate, and the like.

The anions derived from organic acids which may be employed in forming the metal salt catalyst include those derived from organic carboxylic acids, such as the following monocarboxylic acids: saturated fatty acids of up to 18 carbon atoms, e.g., acetic acid, n-propionic acid, n-butanoic acid, n-pentanoic acid, 2-ethylhexanoic acid, 2-carboxybutane and the like; the cycloalkylcarboxylic acids such as cyclohexylcarboxylic acid, cyclopentylcarboxylic acid, and the like; and the aromatic containing carboxylic acids, such as benzoic acid, naphthoic acid, phenylacetic acid, and the like. The carboxylic acid should be free of non-benzenoid carbon to carbon unsaturation. Alkanoic acids of from 1 to 10 carbon atoms and cycloalkyl acids of 5 to 6 carbon atoms in the ring are preferred. Significantly desirable are the saturated fatty acids of from 2 to 4 carbon atoms, such as acetic, propionic, and butyric acids, with acetic acid being the most desirable of the class.

Other organic anions, which in association with the metal forms the catalyst, include those derived from inorganic acids such as the organosulfonic acids, e.g., methyl sulfonic acid, benzene sulfonic acid, p-toluene sulfonic acid, and the like.

The metal catalyst may be the metal in the oxidized state in association with a coordinating agent. Such agents include compounds which complex the metal whereby to provide said metal in an oxidized state (i.e., higher valence state) and include such ligands as, for example, beta-dicarbonyl ketones and esters, e.g., malonic acid esters, acetylacetone, and methylacetoacetate; beta-ketonitriles, e.g., acetoacetonitrile, and the like; as well as a variety of olefinic compounds which can be added in proper quantity whereby to provide said metal in the higher of two valance states, as for example, in the case of palladium, in the Pd (II) oxidation state. Illustrations of such olefinic compounds are those described below as the olefins utilizable in the ethylenicylation reaction.

The compounds contemplated as ethylenylating reagents in this process contain at least one ethylenic group, i.e., $>C=C<$, and are free from acetylenic unsaturation. They desirably contain at least one free hydrogen atom on each carbon atom of the ethylenic group therein and, most preferably, are hydrocarbons, particularly one containing only one ethylenic group. Ethylenic compounds desirable in this process may be characterized by the following formula:

(I) $\quad RR^1C=CR^3R^2$ wherein R, $R^1$, $R^2$, and $R^3$ can be hydrogen or a monovalent hydrocarbon radical free of acetylenic unsaturation, e.g., alkyl, cycloalkyl, aryl, aralkyl, alkaryl, and the like. In addition, two R's together with the ethylenic carbon atoms of Formula I, supra, such as R and $R^1$ or R and $R^2$ or $R^1$ and $R^2$, or $R^2$ and $R^3$ may represent a cycloaliphatic hydrocarbon nucleus containing from 5 to 12 carbon atoms, preferably from 5 to 8 carbon atoms. Illustrative are cyclopentene, cyclohexene, cycloheptene, cyclooctene, cyclododecene, their alkyl and aryl derivatives and the like.

Illustrations of R, $R^1$, $R^2$, and $R^3$ include hydrogen, methyl, ethyl, n-propyl, isopropyl, n-butyl, isobutyl, sec-butyl, the pentyls, the hexyls, the heptyls, the octyls, the dodecyls, the octadecyls, the cyclopentyl, cyclohexyl, cycloheptyl, phenyl, tolyl, xylyl, ethylphenyl, propylphenyl, benzyl, phenylethyl, phenylpropyl, phenylbutyl, and the like. Illustrative compounds include ethylene, propylene, 1-butene, 2-butene, 1-pentene, 2-pentene, 1-hexene, 2-hexene, 3-hexene, 1-heptene, 2-heptene, 3-heptene, the octenes, the decenes, the dodecenes, the octadecenes, cyclopentene, cyclohexene, cycloheptene, cyclooctene, cyclododecene, lower alkyl (1 to 4 carbon atoms) substituted cyclopentene, lower alkyl (1 to 4 carbon atoms) substituted cyclohexene, lower alkyl (1 to 4 carbon atoms) substituted cycloheptene, vinylcyclohexane, allylcyclohexane, vinylcyclopentane, styrene, 3-phenylpropene-1, 4-phenylbutene-1, bicyclo(4.3.0)nona-3,7-diene, the methyl substituted styrenes, the ethyl substituted styrenes, methylenecyclohexane, and the like.

Preferred compounds include the alkenes especially those which have from 2 to about 8 carbon atoms; the cycloalkenes especially those which have from 5 to 6 carbon atoms in the cycloalkenyl nucleus; the vinylcycloalkanes especially those which have from 5 to 6 carbon atoms in the cycloalkyl nucleus; the α-alkenylbenzenes especially those which have from 2 to 4 carbon atoms in the α-alkenyl moiety thereof; and the like. Highly preferred compounds are the vinylic alkenes such as ethylene, propylene, 1-butene, as well as cyclohexene and styrene. Ethylene is most preferred.

As pointed out above, the ethylenylation reaction may be effected solely with the metal containing catalyst in association with the lactam and the ethylenically unsaturated compound. However, it is significantly preferable to provide in the reaction mixture a co-oxidant for the catalyst which serves to maintain the metal of the catalyst in the higher of the two valence states. The co-oxidant, in conjunction with the catalyst, forms a redox system by which ethylenylation of the lactam may be effected over an extended period of time, i.e. for a period of time longer than is obtainable with the catalyst alone. Thus, the presence of the co-oxidant is significantly desirable in the commercial use of the process of this invention.

The co-oxidant is typically the salt or complex form of a metal which possesses at least two stable oxidized states, the higher of which occurs upon reaction with an oxidizing agent therefor, and from which it may be reduced when acting as an oxidant for the reduced catalyst.

The metal co-oxidant may be a salt of the various inorganic and organic acids described previously in the formation of the catalyst salts. Thus, the co-oxidant may be a metal halide, sulfate, etc., a benzene sulfonate, methane sulfonate, etc., and the carboxylates such as derived from the aforementioned carboxylic acids. The co-oxidant may also take the form of a metal complex in which the complexing agents are those described above in the formation of the catalyst. With respect to the salt form, the salt may become a complex during reaction as described above for the catalyst.

Suitable metals for use as a co-oxidant include transition metals (VIB, VIIB, VII and IB of the periodical chart of elements, second cover, Merk Index, 6th edition). The most significantly desirable of the metals is copper. Other metals which may be substituted for copper include Fe, Cr, Co, Ni, Mo, W, Mn, Pb, and the like. Members of the lanthanide series such as cerium or mixtures of the lanthanides are also potentially useful for employment as the co-oxidant component. The use of a mixture of two or more of such metals as, e.g., a couple of Cu and Pb, may also be of value in obtaining the correct range of oxidizing potentials and also to increase the total concentration of the co-oxidant in the process.

Much preferred is the use of the aforementioned copper salts or complexes particularly because of their significant solubility whether in cupric or cuprous state. Because of this the following discussion will be specific to the use of copper as the co-oxidant in conjunction with palladium as the metal of the catalyst component. It is to be understood that the other metals discussed above may be employed as the co-oxidant component in the process of this invention.

The process of this invention achieves optimum results when the solution in which the reaction proceeds is essentially free of halide. It is significant that the instant process is not sensitive to the presence of halide insofar as the over-all function of the process in producing the ethylenylated product is not altered. However, the presence of appreciable halide concentration in the the reaction mixture typically requires the utilization of expensive corrosion resistant equipment and tends to result in the production of unwanted halogenated by-products. Hence, by maintaining the mixture essentially free of halide e.g., the halide concentration is less than 50 parts per million and preferably below 25 parts per million, basis weight of the reaction mixture, it is possible to essentially avoid these difficulties.

It is preferable also that the process of this invention be operated in the absence of strong mineral acids having an ionization constant greater than $5 \times 10^{-3}$, determined in water at 25° C. The presence of strong mineral acids do not preclude the production of the desired substituted lactams but tend to create corrosion and production of unwanted byproducts. However, the process of this invention is preferred operation, does not preclude the presence of substantial amounts of anions of strong mineral acids other than hydrohalic acids so long as they are present as neutral salts, such as sodium sulfate, sodium nitrate, palladous sulfate, cupric nitrate, and the like.

The oxidizing agent employable in this process may be oxygen, per se, or in admixture with other gases such as in the case of air. The oxidizing agent may also be a compound capable of releasing oxygen in the oxidation and reduction reaction, such as the peroxides, e.g., peracetic acid, hydrogen peroxide, oxides of nitrogen, and the like. The oxidizing agent is thought to serve the function of reoxidizing copper to its higher oxidized state, i.e., cupric; and thus the amount of oxygen in the process should be sufficient to effect this result.

The process of this invention simply involves mixing all the aforementioned ingredients in a reaction zone suitable for the incorporation of all of them. It is not mandatory to incorporate the oxidizing agent in the zone where the ethylenylation reaction is effected. Thus, the reaction zone should contain as important ingredients, the ethylenically unsaturated compound e.g., olefin, the lactam, the catalyst, with or without the co-oxidant.

The reaction may be conducted over wide temperature and pressure ranges. The selection of the pressure and temperature for optimum results will depend upon various factors such as the nature of the ethylenically unsaturated reagent, the lactam, catalyst and co-oxidant, the concentration of the components in the reaction, the use of solvents and/or diluents, the equipment employed, and the like.

The reaction temperature typically ranges between 0° C. and 250° C., though lower and higher temperatures may be found suitable. A particularly suitable temperature range is from about 20° C. to about 200° C. In general, the reaction proceeds more favorably at elevated temperatures. A reaction temperature in the range of from about 50° C. to about 160° C. is preferred. It has been observed that significant results are obtained at 80° C. to 130° C.

When the ethylenically unsaturated compound is normally gaseous, it is desirable to operate the process at superatmospheric pressures. On the other hand, when the unsaturated compound is liquid at operating temperatures then pressures less than atmospheric may be employed. In general, wide pressure ranges are within the purview of this invention. It is desirable to employ a total pressure which is at least 1 atmosphere. In many instances, it is preferred to utilize a total pressure slightly greater than 1 atmosphere up to 300 atmospheres and higher. A total pressure of about 10 to 100 atmospheres is highly preferred when gaseous compounds are employed.

The reaction may be effected for a period of time ranging from seconds to several hours depending upon the correlation of factors embodying the operation of this process. For example, the reaction can be completed in less than 1 second or up to 10 hours or longer.

The reaction can be effected in the vapor phase or liquid phase over a fixed catalyst bed or, alternatively, it can be conducted as a homogeneous liquid phase reaction. The homogeneous liquid phase reaction is preferred.

A homogeneous liquid phase reaction may be effected with or without added solvents. The solvent which provides the homogeneous liquid phase may be the ethylenylated (e.g. alkenylated) product formed in situ during the reaction or the starting lactam, provided, however, that the ethylenylated product and the starting lactam are liquid at the temperature of the reaction. Of course, the starting lactam and/or the N-ethylenylated (e.g. alkenylated) derivative may be specifically introduced for this purpose. In addition, there may be provided in the reaction other organic compounds which act as a solvent and are not capable of entering into the reaction. Such materials are classed as inert, normally liquid, organic vehicles, such as hydrocarbon nitriles, e.g., acetonitrile, propionitrile, benzonitrile, and the like; the dialkyl sulfoxides, e.g., dimethyl sulfoxide, and the like; the cyclic sulfoxides, e.g., tetrahydrothiophene-1-oxide, and the like; dialkyl sulfones, e.g., dimethyl sulfone, and the like; the N,N-dialkylcarboxamides, e.g., N,N-dimethylacetamide, N,N-dimethylformamide, and the like; the cyclic sulfones, e.g., sulfolane, and the like; the dialkyl and cyclic carbonates, e.g., diethyl carbonate, ethylene carbonate, and the like; the aliphatic and cyclic ethers, e.g., tetrahydrofuran, dioxane, dimethyl ether of diethylene glycol, dimethyl ether of triethylene glycol, and the like; beta-diketones, e.g., 2,4-pentanedione, beta-ketoesters, e.g., acetoacetic acid esters (e.g. methyl ester) and malonic acid esters (dimethyl malonate); ketodioxane and the like.

It is significantly desirable to maintain the reaction zone or reaction mixture essentially free of water. Preferably, the reaction is effected under essentially anhydrous conditions. In the typical operation of the process, the water content should not exceed 3 percent by weight of the reaction mixture, preferably not in excess of 1.0 percent by weight of the reaction mixture. Most significant results are attained when the water content of the reaction mixture is less than 0.5 percent by weight of the mixture.

It has been surprisingly found that the presence of ammonium, quaternary ammonium and amine salts of the aforementioned carboxylic acids enhance production of N-ethylenylated lactam. Illustrative salts of this class include carboxylic acid salts of ammonia and organo substituted ammonia. Illustrative of these salts are ammonium acetate, ammonium propionate, and other ammonium salts of the carboxylic acids described previously. It has been found that amounts in the range of from about 0.001 to 50 percent by weight of these salts, basis weight of total reaction mixture, may be used. Preferably, the amount employed is from 2 to 20 percent by weight, basis weight of reaction mixture.

The catalyst, for example, the complexes or salts of palladium in the Pd (II) oxidized state, is present in amounts sufficient to catalytically induce the reaction. When the process is effected in the homogeneous liquid phase, a suitable catalyst concentration may be within a range of from about $1 \times 10^{-6}$ weight percent, and lower, to about 5 weight percent and higher, calculated as palladium, per se, based on the total weight of liquids employed in the reaction. A preferred catalyst concentration is in the order of about 0.00001 to about 1.5 weight percent of the catalyst calculated as Pd (II). The character of the reagents, the operative conditions under which the reaction is conducted, the solvent characteristics, and other factors will significantly determine the catalyst concentration necessary for optimum results. The source of the catalyst, i.e., whether the catalyst is best useable in salt or complex form is determined on whether the compound is readily soluble in the reaction medium or can become soluble therein by reaction with one of the components of the medium. Thus, the catalyst may be a compound of palladium other than the salt or complex form which upon incorporation into the medium forms the desired salt or complex.

The operative state for palladium for effecting the reaction is the Pd (II) oxidation state. The aforementioned salts or complex forms employable in the case of palladium (II) include palladous acylates of the aforementioned monocarboxylic acids, e.g., palladous acetate, palladous propionate, palladous butyrate, palladous hexanoate, palladous cyclohexanecarboxylate and the like, coordinate complexes of palladium with ligands such as described above and illustrated by Pd (II) acetylacetonate, and the like. In addition, palladium metal which can be oxidized by a suitable co-oxidant in the reaction medium to Pd (II), and thus form either a salt or a complex product by virtue of the presence in the solution of acid anions or the complexing agents, may be employed. In preferred operation, the Pd (II) is complexed or in salt form with an organic compound, such as the monocarboxylates and ligands described above.

The reaction is typically effected in the presence of sufficient oxygen to essentially prevent the deposition of metal which results from the reduction of the catalytic cation, for example, to essentially prevent the deposition of Pd (O) resulting from the reduction of Pd (II). In other words, the reaction is conducted with sufficient oxygen incorporated therein to maintain the ratio of the co-oxidant in its higher oxidation state relative to its lower oxidation state, e.g., Cu(II)/Cu(I), at a level such that the Cu(II)/Cu(I) couple is capable of converting Pd(O) to Pd(II) at a rate which maintains a catalytically sufficient concentration of Pd(II) and which essentially appreciable deposition of Pd(O). Of course, oxygen is provided when there is employed a co-oxidant. The oxygen serves to maintain the co-oxidant in the higher of its two oxidized states.

The determination of sufficient oxygen is readily ascertainable by a routine periodic analysis of samples of the reaction product mixture for Pd(O) and/or Cu(II). As a practical matter, the concentration of oxygen is a function of the operative temperature and the like, particularly in the case when $O_2$ is fed to the reaction. On the other hand, when a compound is employed which releases elemental oxygen, such as a peroxide, temperature becomes the critical factor. Of course, factors such as residence time, the equipment used, safety factors to be observed, and the like, may impose practical considerations which determine the optimum conditions. For example, should ethylene be the ethylenically unsaturated compound, caution should be exercised in recovery of the unreacted ethylene to avoid build-up to a potentially explosive oxygen-ethylene mixture.

This latter feature invokes need for careful operation since it is significantly desirable to use an oxygen-rich gas in effecting the reaction. For obvious economic and commercial reasons, a substantially pure oxygen feed, e.g., a gas containing at least 90 volume percent oxygen, is preferred. The introduction of substantially pure oxygen (e.g., at least 99 percent by volume pure) into the system significantly insures a more intimate contact with the reactants in a gas phase reaction, when employed. Thus, as stated previously, the oxygen may be utilized as pure molecular oxygen ($O_2$), oxygen in admixture with inert gases such as in the case of air, and oxygen derived by the decomposition of organic and inorganic compounds such as in the case of peroxides, such as peracetic acid, and oxides of nitrogen, such as $N_2O_4$.

The concentration of the co-oxidant in the reaction is variable over a wide range. For example, the molar ratio of Cu(II) to Pd(II) can vary from about 0.5 and upwards to several thousand or more. It is desirable to employ a molar ratio of Cu(II) to Pd(II) of greater than one and preferably significantly greater than 1, e.g., greater than 10 and upwards to 60,000 and higher. Of course, the maximum concentration of Cu(II) relative to Pd(II) is dependent upon the operating conditions, particularly when the reaction is carried out in a homogeneous liquid phase, though it is to be appreciated that the instant invention finds favor in a high molar ratio of Cu(II) to Pd(II).

For practical and optimum results it is highly desirable to achieve the maximum solubility of Cu(II) either as a salt or complex form in the homogeneous liquid phase employed. It is desirable to exceed the normal maximum solubility of Cu(II) whereby to provide a larger Cu(II) salt or complex reservoir. The source of the copper oxidant in Cu(II) oxidized state is readily obtained from the cupric compounds described above, such as as the salts and complex cupric compounds.

The particular selection of the co-oxidant, whether in salt or complex form, is dependent upon the solubility and adaptability in the reaction mixture when a homogeneous liquid phase is employed or its adaptability in the reaction when a gas phase reaction is effected. Of course, copper compounds which are capable of converting to the aforementioned salts or complexes may be employed. Illustrative of these is cupric oxide which in the reaction medium converts to the salt or complex form. A minimum amount of testing will determine the exact reactants desirable under the conditions of operation particularly if recourse is made to the teachings herein.

The concentration of the ethylenically unsaturated compound depends to a substantial extent upon many variables. For example, in the case of a homogeneous liquid phase reaction, the solubility of the compound in the liquid phase is dependent upon its character, i.e., whether it is a liquid or gaseous compound at operating temperatures. Of course, a liquid compound is easily incorporated in the liquid phase and the extent of incorporation is dependent upon the solvent employed, e.g., whether the solvent is an inert liquid organic compound or the lactam or N-ethylenylated lactam. In the case where the ethylenic compound, e.g., an olefin, is gaseous at operating conditions the solubility of the compound under operative conditions of the reaction is proportional to the pressure, or differently expressed, the partial pressure of the olefin above the liquid reaction mixture will directly effect the amount of olefins incorporated in the reaction mixture and hence effect to some degree the amount of N-ethylenylated product obtainable.

In general, amounts of the ethylenically unsaturated compound at least sufficient to maintain substantially all of the Pd(II) in the form of a pi-complex is desirable, though lesser amounts of the olefin may be employed with the consequent disadvantage of lower reaction rates and reduced amounts of N-substituted products. Usually there is employed at least one mole of unsaturated compound in the reaction mixture for each mole of palladium therein. The practical upper limit of the concentration of unsaturated compound is that which measurably decreases the solubility of inorganic containing components, e.g., the co-oxidant of the reaction mixture.

When a homogeneous liquid phase reaction is employed using the aforementioned components in a solvent medium, the solvent employed should be sufficient to maintain reasonable dissolution of the Pd(II) and Cu(II) components in amounts sufficient to give desired yields.

This process can be effected in a batch, semi-continuous or continuous manner. Equipment can be fabricated of glass, metals such as stainless steel, nickel, titanium, alloys thereof and other conventionally employed materials to best suit the particular needs of the contemplated operative conditions.

One suitable and desirable manner for effecting the reaction is to first prepare a liquid mixture of co-oxidant, e.g., Cu(II), solvent, and catalyst, e.g., Pd(II). Under the desired operative conditions of temperature and pressure, the ethylenically unsaturated compound, e.g., ethylene, and oxygen can be introduced e.g., as an admixture or separately but simultaneously, or separately in stages, into the homogeneous liquid phase reaction medium. The reaction product and water can be continuously removed from the reaction zone and the product is recoverable by conventional procedures well known to the art, such as distillation, decantation, crystallization and the like. Water removal is effected in amounts sufficient to avoid excess build-up of water.

The reaction may also be effected utilizing the inert, normally-liquid organic solvents described above. These organic solvents are typically polar compounds which are capable of enhancing the solubility of the metal salts or complexes in the homogeneous liquid reaction mixture, particularly in the case of the Cu(II) salt or complex. These solvents are inert with respect to the reagents and products produced. In view of their ability to enhance solubility of the redox agents, the reaction rates are favorably increased.

The process of this invention is adaptable to many procedures for commercial utilization and one which is preferred involves a two-step operation. The first step is the one in which the reaction is effected. The second step is the one in which the copper (I) component is re-oxidized prior to re-introduction into the reaction. This two-step process is essentially a cyclic process involving the continuous production of N-ethylenylated lactam by the continuous regeneration of the co-oxidant outside of the reaction zone. In the reaction step, the ethylenically unsaturated compound is contacted with the catalyst, the co-oxidant, and the lactam under the conditions noted previously to produce the N-ethylenylated lactam. It is desirable to first prepare a homogeneous liquid phase containing the solvent, the lactam, the catalyst and the co-oxidant and then contacting this homogeneous liquid phase with the ethylenically unsaturated compound. Thereafter, the product and water, as well as unreacted unsaturated compound, if present, are recovered from the reaction product mixture via conventional techniques, e.g., distillation under reduced pressure. The remainder or residue which typically contains some co-oxidant in the lower oxidation state, e.g., Cu(I), is contacted with sufficient oxygen to regenerate the co-oxidant from Cu(I) to Cu(II), i.e., from a lower state of oxidation to a higher state of oxidation. Purging of excessive amounts of ingredients may be effected by distillation or by withdrawing a side stream of the regenerated mixture. Make-up reagents may be added at this time to the mixture. The regenerated mixture is then recycled to the reaction step. It may be found necessary to provide additional salt forming agents or complexing agents to the reaction medium or to the regenerated mixture prior to the reaction step. Another liquid organic solvent, such as described previously, may be employed during the reaction step and/or regeneration step as is found necessary.

Moreover, the process may be effected in an essential vapor or gas phase operation. For example, the co-oxidant, such as Cu(II) either as a salt or complex, may be coated with the catalyst, such Pd(II) in salt or complex form, on an inert particle base (such as silica) thereby to form a particulate catalyst mass. Desirably, the coated particles are of a size suitable for fluidization. Their size may range from 1 micron to 1,000 microns. A bed of these particles may then be placed in a fluidizer, such as a cylindrical shaft furnace having a porous base plate. The bed of particles may be brought to and maintained in a dynamic state characterized as the fluidized state by feeding through the base plate gaseous ethylenically unsaturated compound and/or oxygen in the amounts indicated above for such an operation. If the lactam is gaseous at reaction temperature, it may be fed through the base plate as a gas or poured into the fluidizer, while liquid or solid particles, just above the base plate. If the lactam is liquid or solid at the reaction temperature, it may be poured into the fluid bed from the top of the fluidizer. If the lactam is a solid, it should be finely ground before feeding to the bed. The fluidizing rates or velocity rates of the gaseous components to the bed depend upon a plurality of factors well known in the fluidizing art and such are applicable here. It is preferred that the fluid bed reaction be effected with as much available catalyst surface as is possible and therefore the redox catalyst particles in the bed preferably range between 20 to 200 microns in size. The gas velocity should be sufficient to effect a bed in dynamic state, typically in a fluidized state, yet not sufficient to blow-over an excess amount of those particles that fall in the preferred range. The residence time of the reaction components is determined by the temperature employed and the gas velocity. In addition, the ethylenically unsaturated compound's gas velocity should exceed its oxygen flame velocity when the temperature in the reactor is high enough for combustion and free elemental oxygen is present in the reactor.

The process may also be effected in a countercurrent homogeneous liquid phase operation. In this type of operation the solvent containing the lactam, catalyst and co-oxidant may be fed to the top of a column and the ethylenic compound may be fed to the bottom of the column. The catalyst may be regenerated at any one of the stages of the column by feeding oxygen with the ethylenic compound or it may be regenerated outside of the column. To increase contact between the reactants, the components within the column may be agitated. This may be effected through use of a rotating disc column (RDC).

The following examples serve to illustrate specific embodiments to which the present invention is not limited.

EXAMPLE I

The glass liner of a 3-liter stainless steel rocker bomb is charged with 255 grams of 2-pyrrolidone, 8.89 grams of $PdCl_2$, 91 grams of anhydrous cupric acetate and 300 milliliters of dry acetonitrile. The bomb is flooded with nitrogen, heated to 50° C. and then is charged to 500 p.s.i.g. with ethylene. The bomb is heated at 45–50° C. for 8 hours during which there is a slow uptake of ethylene. The cool bomb contents are filtered and the filtrate flash distilled at low pressure. Fractional distillation removes the solvent and leaves a solution containing N-vinyl pyrrolidone and starting lactam (gas chromatography on a 10' x ¼" column of 10 percent Apiezon on fire brick at 180° C.). Heating of this solution causes reduction in the vinyl pyrrolidone concentration and leads to the formation of a water soluble, nonvolatile residue identified as a low molecular weight poly(N-vinylpyrrolidone) (identified by comparison of infrared spectrum with that of an authentic sample).

EXAMPLE II

The glass liner of a 3-liter stainless steel rocker bomb is charged with 249 grams of 2-pyrrolidone, 8.9 grams of $PdCl_2$, 85 grams of $CuCl_2$, 70.5 grams of $Na_2HPO_4$ and 300 milliliters of acetonitrile. This mixture is shaken with 300 p.s.i.g. of ethylene at 44–52° C. for 8 hours. During this period ethylene pressure decreases about 130 p.s.i. Working up the reaction as in Example I, an alcohol extract of residue from flock distillation gives 25 grams of low molecular weight poly(vinylpyrrolidone) (identified by comparison of its infrared spectrum with that of an authentic sample). Heating the flock distillate gives a small additional amount of poly(vinylpyrrolidone).

EXAMPLE III

The glass liner of a 3-liter stainless steel rocker bomb is charged with 246 grams of 2-pyrrolidone, 67.2 grams of anhydrous $CuCl_2$, $PdCl_2$ (8.9 grams), and 138 grams of $K_2CO_3$ (anhydrous). Ethylene is charged to the nitrogen flushed bomb to a pressure of 1000 p.s.i.g. After 3 hours the bomb is cooled, vented and opened. The contents are filtered and the filtrate is flash distilled in vacuum at a temperature of 100° C. The flask distillate contains a considerable concentration of vinylpyrrolidone (shown by gas chromatography on a 20' x ¼" column of UCON-Polar on fire brick at 182° C.).

The residue from the flash distillation is dissolved in water and the aqueous solution is then extracted three times with methylene chloride. The methylene chloride extract is worked with water, dried and then the methylene chloride removed in vacuum. A viscous, water soluble residue which remains is shown to be low molecular weight poly(N-vinylpyrrolidone) by comparison of its infrared spectrum with that of an authentic specimen.

EXAMPLE IV

A glass rocker bomb liner is charged with 200 grams of 2-ketopiperidine, 8.9 grams of $PdCl_2$, 91 grams of anhydrous cupric acetate and 200 milliliters of acetonitrile and 1000 p.s.i.g. of ethylene under the conditions described in Example I to give, after work-up as described in Example I and removal of acetonitrile by fractional distillation in vacuum, a residue consisting of a solution of the starting lactam and the corresponding N-vinylvalerolactam. Identification is made by comparison of retention times on a 20' x ⅛" gas chromatographic column packed with a Cyano-Silicone polymer on a powdered Teflon support.

EXAMPLE V

Similarly, substitution of epsilon-caprolactam for 2-ketopiperidine in the reaction described in Example IV gives a solution of N-vinyl caprolactam and starting lactam as shown by gas chromatography on the cyano-silicon on powdered Teflon column described in Example IV.

EXAMPLE VI

Substitution of 3-azabicyclo[3.2.1]octan-2-one for 2-ketopiperidine in the reaction described in Example IV gives a solution of the corresponding N-vinyl lactam in starting material as shown by gas chromatography on a 20' x ⅛" cyanosilicone/powdered Teflon column.

The specific details set forth hereinabove are not intended to act to limit this invention except to the extent provided in the claims.

What is claimed is:

1. A process for the preparation of N-ethylenically unsaturated organic substituted lactams which comprises effecting contact between a lactam containing nitrogen bonded directly to hydrogen and an ethylenically unsaturated hydorcarbon free of acetylenic unsaturation in the presence of a reduceable metal compound as the catalyst therefor, said metal compound being capable of possessing the higher of two stable valence states while complexed with said unsaturated hydrocarbon, and the metal moiety of said metal compound being a precious metal of the transition series.

2. The process of claim 1 wherein there is provided in said reaction a metal compound co-oxidant in the higher of at least two stable oxidized states which, upon reduction of said catalyst, affects oxidation of said catalyst, thereby regenerating said catalyst for further reaction of said ethylenically unsaturated hydrocarbon with said lactam, the metal moiety of said metal compound co-oxidant being of the group consisting of copper, chromium, cobalt, nickel, molybdenum, tungsten, manganese, lead, cerium, and mixtures thereof.

3. The process of claim 2 wherein said co-oxidant is repeatedly regenerated by contacting it with an oxidizing agent.

4. The process of claim 3 wherein said oxidizing agent for said co-oxidant is contacted with said co-oxidant prior to providing said co-oxidant in the reaction of said ethylenically unsaturated hydrocarbon with the lactam.

5. The process of claim 3 wherein said oxidizing agent is contacted with said co-oxidant during the catalytic reaction resulting in the formation of the N-ethylenically unsaturated organic substituted lactam.

6. The process of claim 2 wherein said catalyst is a precious metal of the transition series in oxidized state.

7. The process of claim 6 wherein the catalyst is an oxidized metal selected from the group consisting of palladium, platinum, iridium, rhodium, ruthenium, osmium and gold.

8. The process of claim 7 wherein the catalyst is palladium.

9. The process of claim 8 wherein palladium is employed in the oxidized form selected from the group consisting of salts and coordination complexes of palladium.

10. The process of claim 9 wherein the ethylenically unsaturated hydrocarbon is an olefin free of acetylenic unsaturation.

11. The process of claim 10 wherein the olefin is ethylene.

12. The process of claim 11 wherein the lactam is 2-pyrrolidone and the reaction product is 2-vinylpyrrolidone.

13. The process of claim 2 wherein the co-oxidant is a copper compound selected from the group consisting of salts and coordination complexes of copper.

14. The process of claim 9 wherein the co-oxidant is a copper compound selected from the group consisting of salts and coordination complexes of copper.

15. The process of claim 11 wherein the co-oxidant is a copper compound selected from the group consisting of salts and coordination complexes of copper.

No references cited.

ALEX MAZEL, *Primary Examiner.*

HENRY R. JILES, *Examiner.*

JOSEPH A. NARCAVAGE, *Assistant Examiner.*

Notice of Adverse Decision in Interference

In Interference No. 96,341 involving Patent No. 3,318,906, J. E. McKeon and P. S. Starcher, PROCESS FOR THE PRODUCTION OF ETHYLENYLATED LACTAMS, final judgment adverse to the patentees was rendered Sept. 29, 1969, as to claims 1, 2 and 6–15.

[*Official Gazette March 17, 1970.*]